(12) United States Patent
Adachi et al.

(10) Patent No.: US 10,408,092 B2
(45) Date of Patent: Sep. 10, 2019

(54) HEAT EXCHANGER, ENERGY RECOVERY SYSTEM, AND VESSEL

(71) Applicants: Kobe Steel, Ltd., Hyogo (JP); ASAHI SHIPPING CO., LTD., Tokyo (JP); TSUNEISHI SHIPBUILDING CO., LTD., Hiroshima (JP); MIURA CO., LTD., Ehime (JP)

(72) Inventors: Shigeto Adachi, Takasago (JP); Kazuo Takahashi, Kobe (JP); Tetsuro Fujii, Tokyo (JP); Kazuya Arahira, Tokyo (JP); Masakazu Yamamoto, Hiroshima (JP); Yutaka Kobayashi, Hiroshima (JP); Toshio Sageshima, Hiroshima (JP)

(73) Assignees: Kobe Steel, Ltd., Hyogo (JP); ASAHI SHIPPING CO., LTD., Tokyo (JP); TSUNEISHI SHIPBUILDING CO., LTD., Hiroshima (JP); MIURA CO., LTD., Ehime (JP)

(*) Notice: Subject to any disclaimer, the term of this patent is extended or adjusted under 35 U.S.C. 154(b) by 123 days.

(21) Appl. No.: 15/549,017

(22) PCT Filed: Feb. 2, 2016

(86) PCT No.: PCT/JP2016/053024
§ 371 (c)(1),
(2) Date: Aug. 4, 2017

(87) PCT Pub. No.: WO2016/129451
PCT Pub. Date: Aug. 18, 2016

(65) Prior Publication Data
US 2018/0023422 A1    Jan. 25, 2018

(30) Foreign Application Priority Data
Feb. 13, 2015    (JP) .................................. 2015-026648

(51) Int. Cl.
*F01K 23/00* (2006.01)
*F01K 23/06* (2006.01)
(Continued)

(52) U.S. Cl.
CPC .............. *F01K 23/10* (2013.01); *F01K 23/06* (2013.01); *F01K 23/065* (2013.01); *F01K 25/10* (2013.01);
(Continued)

(58) Field of Classification Search
CPC ...... F01K 23/10; F01K 23/101; F01K 23/103; F01K 23/105; F01K 23/106;
(Continued)

(56) References Cited

U.S. PATENT DOCUMENTS 6,321,552 B1 * 11/2001 Frederiksen ............. B60H 1/32
                                                               123/41.23
6,688,292 B2 *  2/2004 Ruppel ............... F02B 29/0412
                                                               123/563
(Continued)

FOREIGN PATENT DOCUMENTS

DE    102007026869 A1 * 12/2008 ................ F01P 3/22
EP       2 500 530 A1    9/2012
(Continued)

OTHER PUBLICATIONS

International Search Report issued in PCT/JP2016/053024; dated May 10, 2016.
(Continued)

*Primary Examiner* — Jason D Shanske
*Assistant Examiner* — Jessica L Kebea
(74) *Attorney, Agent, or Firm* — Studebaker & Brackett PC

(57) ABSTRACT

A heat exchanger is for use in an energy recovery system to be mounted on a vessel including an engine, a supercharger
(Continued)

and an economizer, the heat exchanger including: a first heat section for heating a working medium by supercharged air from the supercharger; a second heat section for heating the supercharged air by steam generated by the economizer before the supercharged air flows into the first heat section; and a third heat section for heating the working medium having been heated in the first section by the supercharged air which is to be heated in the second section.

8 Claims, 4 Drawing Sheets

(51) Int. Cl.

| | | |
|---|---|---|
| *F01K 25/10* | (2006.01) | |
| *F01K 27/02* | (2006.01) | |
| *F01N 5/02* | (2006.01) | |
| *F02G 5/00* | (2006.01) | |
| *F02G 5/04* | (2006.01) | |
| *B63J 3/02* | (2006.01) | |
| *F01K 25/08* | (2006.01) | |
| *F01K 23/10* | (2006.01) | |

(52) U.S. Cl.
CPC ............... *F01K 27/02* (2013.01); *F01N 5/02* (2013.01); *F02G 5/00* (2013.01); *F02G 5/04* (2013.01); *B63J 3/02* (2013.01); *F01K 25/08* (2013.01); *Y02E 20/14* (2013.01); *Y02T 10/16* (2013.01); *Y02T 10/166* (2013.01)

(58) Field of Classification Search
CPC ...... F01K 23/108; F01K 23/065; F01K 27/02; F02G 5/04; Y02T 10/16; Y02T 10/166
See application file for complete search history.

(56) References Cited

U.S. PATENT DOCUMENTS

| | | | | |
|---|---|---|---|---|
| 7,669,417 | B2* | 3/2010 | Smith ................. | F02B 29/0443 123/41.12 |
| 8,302,399 | B1* | 11/2012 | Freund ..................... | F01N 5/02 60/605.1 |
| 2005/0279333 | A1* | 12/2005 | Kweon ..................... | C01B 3/34 123/557 |
| 2008/0022684 | A1 | 1/2008 | Baldwin et al. | |
| 2009/0031999 | A1* | 2/2009 | Erickson ............ | F02B 29/0443 123/563 |
| 2009/0320477 | A1* | 12/2009 | Juchymenko ......... | F01K 23/065 60/651 |
| 2010/0281865 | A1* | 11/2010 | Lehar ..................... | F01K 23/10 60/671 |
| 2011/0209474 | A1* | 9/2011 | Leibowitz ............... | F01K 23/04 60/641.1 |
| 2016/0076405 | A1* | 3/2016 | Hashimoto ............. | F01K 25/08 60/653 |

FOREIGN PATENT DOCUMENTS

| | | | | |
|---|---|---|---|---|
| FR | 2416340 A1 * | 8/1979 | ............ | F01K 23/06 |
| GB | 2033017 A | 5/1980 | | |
| JP | 2011-074897 A | 4/2011 | | |
| JP | 2011-106302 A | 6/2011 | | |
| JP | 2013-068137 A | 4/2013 | | |
| JP | 2013-160132 A | 8/2013 | | |
| JP | 2013-181571 A | 9/2013 | | |

OTHER PUBLICATIONS

The extended European search report issued by the European Patent Office dated Sep. 4, 2018, which corresponds to European Patent Application No. 16749095.2-1007 and is related to U.S. Appl. No. 15/549,017.

* cited by examiner

HEAT EXCHANGER, ENERGY RECOVERY SYSTEM, AND VESSEL

TECHNICAL FIELD

The present invention relates to a heat exchanger to be mounted on a vessel, an energy recovery system including a heat exchanger, and a vessel mounted with an energy recovery system.

BACKGROUND ART

Conventionally, an energy recovery system has been known to recover thermal energy in various facilities. As shown in FIG. 4, Patent Literature 1 discloses an exhaust heat recovery system as an exemplary energy recovery system to recover thermal energy of a diesel engine 500 on a vessel, and generate an electric power by utilizing the recovered thermal energy. The exhaust heat recovery system includes a first exhaust heat receiver 700 for heating an organic medium M by air cooling water W having flown out of an air cooler 600 for cooling compressed air A discharged from a supercharger 510 of the diesel engine 500, the organic medium M having a lower boiling point than the air cooling water W. After taking heat of the compressed air A in the air cooler 600, the air cooling water W takes heat of an exhaust gas G conveyed from the supercharger 510 to a chimney 800, and then, flows into the first exhaust heat receiver 700. In other words, the exhaust heat recovery system of Patent Literature 1 causes the air cooling water W to perform heat exchange with two heat mediums, that is, the compressed air A and the exhaust gas G, thereby heating the organic medium M by the air cooling water W having a temperature which has risen owing to the heat exchange. In this manner, the thermal energy of the diesel engine 500 is recovered by the means of the organic medium M.

The exhaust heat recovery system of Patent Literature 1 can recover the thermal energy of the two heat mediums, that is, the compressed air A and the exhaust gas G. However, the thermal energy is transferred to the organic medium M via the air cooling water W having a higher boiling point than the organic medium M. Hence, it is more difficult for this system to recover the sufficient thermal energy than a system where the thermal energy of the compressed air A and the exhaust gas G is directly taken by the organic medium M. Particularly, in a vessel mounted with an exhaust heat recovery system, for example, a diesel engine 500 will be appreciated to run at a low load to suppress fuel consumption. In this case, the thermal energy of the compressed air A that is taken by the air cooling water W becomes smaller, and thus it is even more difficult to recover the sufficient thermal energy.

CITATION LIST

Patent Literature

Patent Literature 1 Japanese Unexamined Patent Publication No. 2013-160132

SUMMARY OF INVENTION

An object of the present invention is to provide a heat exchanger having solved the aforementioned problem, an energy recovery system including the heat exchanger, and a vessel mounted with the energy recovery system.

A heat exchanger according to one aspect of the present invention is for use in an energy recovery system to be mounted on a vessel including an engine, a supercharger for supplying supercharged air to the engine, and an economizer for generating steam by utilizing heat of an exhaust from the engine, the heat exchanger being adapted for transferring heat of the supercharged air and the steam to a working medium for driving an expander of the energy recovery system, the heat exchanger including: a first heat section for heating the working medium by the supercharged air; a second heat section for heating the supercharged air by the steam generated by the economizer before the supercharged air flows into the first heat section; and a third heat section for heating the working medium having been heated in the first section by the supercharged air which is to be heated in the second heat section.

DESCRIPTION OF EMBODIMENTS

First Embodiment

Figure 1:
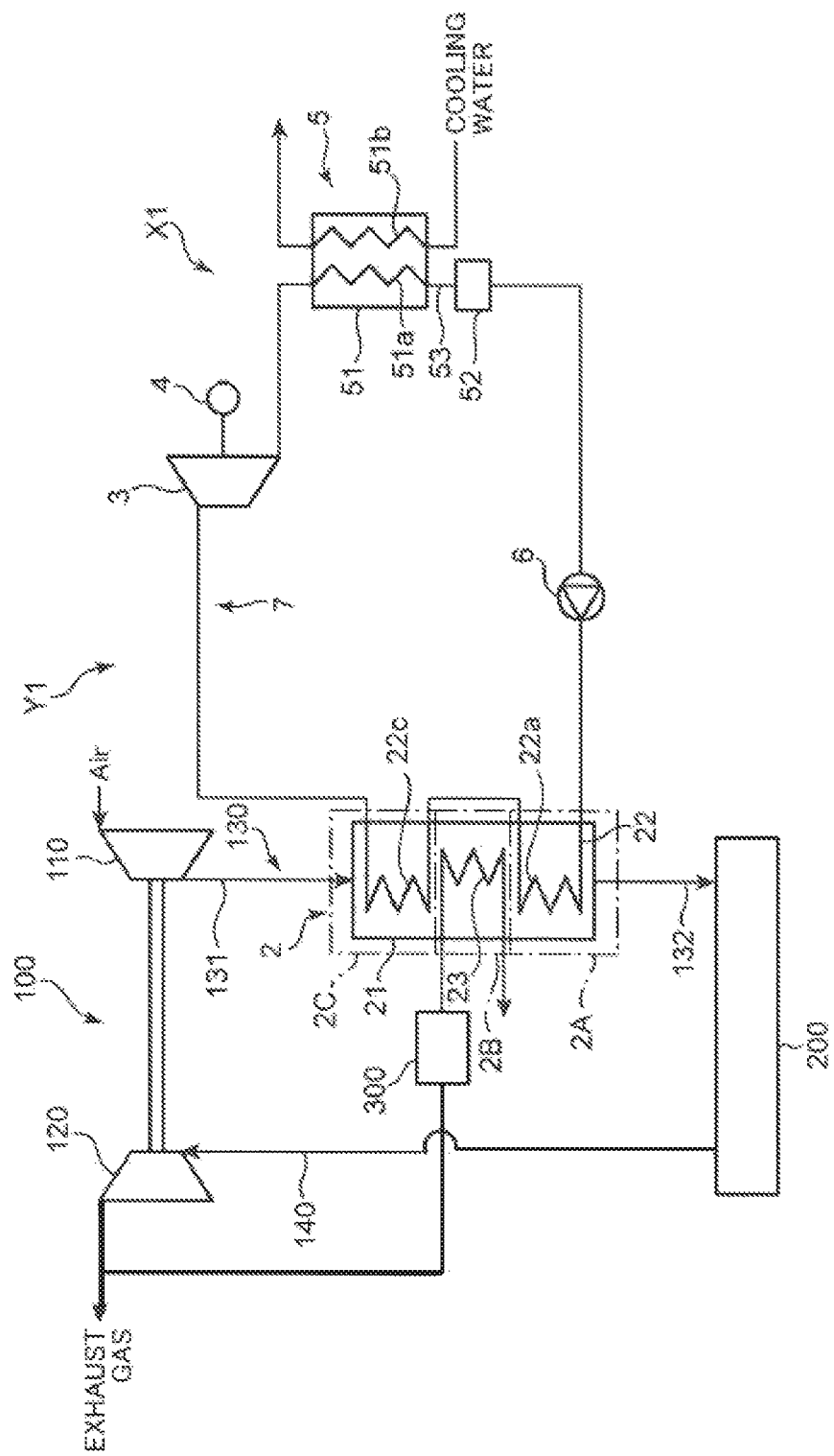
FIG. 1 is a schematic diagram showing a configuration of a vessel Y1 according to a first embodiment of the present invention.

Hereinafter, a first embodiment of the present invention will be described with reference to the accompanying drawings. However, it should be noted that, in consideration of explanation, the respective drawings to be referred to hereafter are simply illustrated by primary components required to describe a vessel Y1 among constituent components of the embodiment of the present invention. Therefore, the vessel Y1 according to this embodiment may be provided with desired constituent components unillustrated in the respective drawings referred to in the present specification.

The vessel Y1 includes an energy recovery system X1, a supercharger 100, an engine 200, and an economizer 300.

The supercharger 100 includes a compressor 110, a turbine 120, a scavenging line pipe 130, and an exhaust line pipe 140. Supercharged air having been compressed in the compressor 110 is supplied to the engine 200 by the way of the scavenging line pipe 130. Exhaust gas having occurred in the engine 200 is conveyed to the turbine 120 by the way of the exhaust line pipe 140. The turbine 120 is driven by expansion energy of the exhaust gas, and the compressor 110 is driven by a driving power of the turbine 120.

The economizer 300 takes heat of the exhaust gas discharged from the engine 200 to generate steam from water. In each of the drawings, although the economizer 300 is depicted in a position away from the exhaust line pipe 140 for clarification, it should be noted that the economizer 300 is actually connected to the exhaust line pipe 140 at a downstream position of the turbine 120.

The energy recovery system X1 is used as an electric power generating system utilizing a Rankine cycle of a working medium, and includes the working medium, a heat exchanger 2, an expander 3, an electric power generator 4, a condensing unit 5, a pump 6, and a circulation flow tube 7. In this embodiment, an organic fluid having a lower boiling point than water is used as the working medium. For example, the working medium includes R245fa or the like.

The circulation flow tube 7 connects the heat exchanger 2, the expander 3, the electric power generator 4, the condensing unit 5, and the pump 6 with one another in this order. The heat exchanger 2 is on the scavenging line pipe 130. In the heat exchanger 2, the heat of the supercharged air and the steam flown out of the economizer 300 is imparted to the working medium.

The expander 3 is on a downstream side of the heat exchanger 2 in a flow direction of the working medium. In this embodiment, a screw expander is used as the expander 3, and has a screw rotor that is rotatably driven by the expansion energy of the working medium in the state of gas. However, the expander 3 should not be limited to the screw type, but may be of a centrifugal type, a scrawl type, and the like. The electric power generator 4 is connected to the expander 3.

The condensing unit 5 is on the downstream side of the expander 3 in the flow direction of the working medium. The condensing unit 5 includes a condenser 51 and a storage part 52. The condenser 51 has a working medium flow passage 51a for allowing the working medium to flow therethrough, and a cooling water flow passage 51b for allowing the cooling water to flow therethrough. The storage part 52 is on a downstream side of the condenser 51 in the flow direction of the working medium. The storage part 52 stores the working medium in the state of liquid. The working medium flow passage 51a of the condenser 51 and the storage part 52 are connected with each other by a connection tube 53.

The pump 6 is connected to the circulation flow tube 7 between the storage part 52 and the heat exchanger 2. The pump 6 supplies the heat exchanger 2 with the working medium in the state of liquid having been stored in the storage part 52. As the pump 6, used is a centrifugal pump having an impeller rotor, a gear pump having a pair of gear rotors, or the like.

When the energy recovery system X1 is put in operation, the working medium in the state of liquid is heated to convert to superheated vapor by the supercharged air and the steam in the heat exchanger 2. Then, the working medium flows out of the heat exchanger and into the expander 3 to thereby drive the expander 3. The driving power of the expander 3 is transmitted to the electric power generator 4 to thereby generate an electric power. The working medium in the state of gas having been expanded in the expander 3 flows into the working medium flow passage 51a of the condenser 51. In the condenser 51, the working medium undergoes condensation owing to heat exchange with the cooling water flowing through the cooling water flow passage 51b. The condensed working medium flows into the storage part 52. Subsequently, the working medium in the state of liquid having been stored in the storage part 52 is supplied to the heat exchanger 2 by the pump 6. In this manner, the energy recovery system X1 can ensure stable generation of the electric power by the working medium circulating through the circulation flow tube 7 owing to the heat of the supercharged air and the steam.

Next, a configuration of the heat exchanger 2 will be described. The heat exchanger 2 includes a heat exchanger body 21, a working medium tube 22 for allowing the working medium to flow therethrough, and a steam tube 23 for allowing the steam from the economizer 300 to flow therethrough. The heat exchanger body 21 accommodates the working medium tube 22 and the steam tube 23 therein.

The heat exchanger body 21 defines therein a chamber space for permitting the supercharged air to flow from the supercharger 100 to the engine 200 outside the working medium tube 22 and the steam tube 23. In this embodiment, the chamber space of the heat exchanger body 21 is referred to as "supercharged air flow space". An upstream portion of the supercharged air flow space in a flow direction of the supercharged air is connected to a first scavenging line 131 which is an upstream part of the scavenging line pipe 130, and a downstream portion of the supercharged air flow space is connected to a second scavenging line 132 which is a downstream part of the scavenging line pipe 130.

The working medium tube 22 has an upstream portion 22a and a downstream portion 22c respectively located at an upstream position and a downstream position in the flow direction of the working medium. The upstream portion 22a and the downstream portion 22c are respectively accommodated in the heat exchanger body 21. In the heat exchanger body 21, the upstream portion 22a and the downstream portion 22c of the working medium tube 22 are respectively located at a downstream position and an upstream position in the flow direction of the supercharged air.

The steam tube 23 is accommodated in the heat exchanger body 21, and lies between the upstream portion 22a and the downstream portion 22c.

In the following description, the heat exchanger 2 has a section referred to as "first heat section 2A" including the upstream portion 22a of the working medium tube 22 and a part of the supercharged air flow space, another section referred to as "second heat section 2B" including the steam tube 23 and a part of the supercharger air flow space, and further another section referred to as "third heat section 2C" including the downstream portion 22c of the working medium tube 22 and a part of the supercharged air flow space.

The heat exchanger 2 permits the supercharged air to flow in the order of the third heat section 2C, the second heat section 2B and the first heat section 2A, and the working medium to flow in the order of the first heat section 2A and the third heat section 2C. In other words, the supercharged air and the working medium flow in the opposite directions to each other, which form the opposite flows in the heat exchanger 2. The first heat section 2A and the third heat section 2C allow the working medium to be heated by the supercharged air, and the second heat section 2B allows the supercharged air to be heated by the steam.

Figure 2:
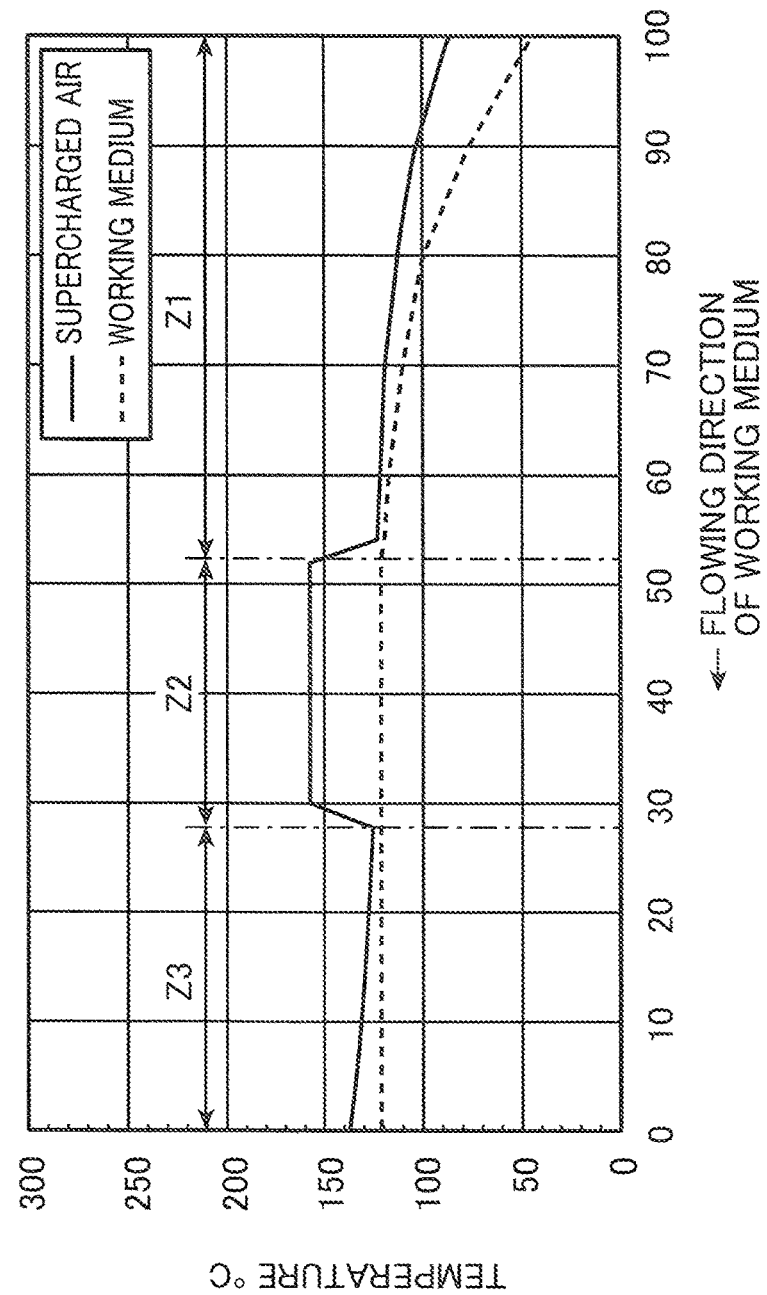
FIG. 2 is a graph showing an operation temperature of supercharged air and a working medium in a heat exchanger of an energy recovery system according to the embodiment.

FIG. 2 shows a result of a temperature change simulation of the supercharged air and the working medium passing through the heat exchanger 2. It should be noted here that FIG. 2 shows a zone Z1 in which the first heat section 2A allows the working medium to be heated, a zone Z2 in which the second heat section 2B allows the supercharged air to be heated, and a zone Z3 in which the third heat section 2C allows the working medium to be heated.

When the energy recovery system X shown in FIG. 1 is put in operation, the working medium in the state of liquid flows into the first heat section 2A, and is heated therein by the supercharged air having passed through the second section 2B. It is seen from the broken line in FIG. 2 that the working medium in the state of liquid shows a temperature rise by being heated by the super charged air in the zone Z1, and reaches a boiling point shortly before the zone Z2. The boiling point of the working medium in this embodiment is 122.1° C. The working medium in the state of liquid converts to vapor.

As shown in FIG. 1, the working medium in the state of gas having flown out of the first heat section 2A flows into the third section 2C, and is further heated therein by the supercharged air just having flown into the heat exchanger body 21 via the first scavenging line 131. In other words, in the third heat section 2C, the working medium having been heated in the first section 2A is further heated by the supercharged air which is to be heated in the second heat section 2B. As a result, the working medium converts to the superheated vapor, and the superheated vapor flows out of the third heat section 2C. Also, in FIG. 2, the temperature of the working medium is shown to be constant in the zone Z3. However, the temperature of the working medium in the state of gas is likely to rise in the third heat section 2C. The working medium having converted to the superheated vapor is hard to partly condense to liquid on the way from the heat exchanger 2 to the expander 3.

In contrast, it is seen from the solid line in FIG. 2 that the supercharged air shows a gradually temperature lowering in the zone Z3 due to the heat exchange with the working medium, after flowing into the third heat section 2C from the compressor 110. After that, the supercharged air flows into the second heat section 2B where it is heated by the steam flowing through the steam tube 23. In other words, in the second heat section 2B, the supercharged air is heated by the steam, before flowing into the first heat section 2A. As a result, the temperature of the supercharged air rises much higher than the boiling point of the working medium in the zone Z2. Moreover, the steam undergoes condensation owing to the heat exchange, and the condensate flows out of the heat exchanger body 21. The supercharged air having restored heat energy comes into the first heat section 2A where its temperature lowers again due to heat exchange with the working medium in the state of liquid. Besides, as shown in FIG. 1, the supercharged air having the lowered temperature proceeds to the engine 200 from the first heat section 2A. Hence, the vessel Y1 can eliminate a cooling system to cool the supercharged air. Even if necessary, it may be enough to provide a cooling system having a low cooling capability. These are because the supercharged air is cooled by the heat exchanger 2. This configuration can save a considerable electric power required to operate a cooling system.

The configuration and operation of the energy recovery system X1 mounted on the vessel Y1 is described above. In the heat exchanger 2 for use in the energy recovery system X1, the supercharged air having the temperature which has lowered due to the heat exchange with the working medium in the third heat section 2C is heated in the second heat section 2B by the steam generated by the economizer 300. This configuration permits the supercharged air to ensure heating of the working medium in the state of liquid in the first heat section 2A. Accordingly, the energy recovery system X1 can recover the thermal energy required to drive the expander 3 and the electric power generator 4. Particularly, even in a case that the engine 200 of the vessel Y1 is run at a low load, i.e., at a load of 40% to 60% (more preferably 45% to 50%), which causes the supercharged air to be sent from the compressor 110 to the engine 200 to have a lower temperature than the engine 200 run at a high load, it is possible to ensure the thermal energy required to drive the energy recovery system X1 owing to the heating of the supercharged air by the steam.

The energy recovery system X1 which is used as an electric power generating system utilizing the Rankine cycle of an organic fluid having a low boiling point can more effectively recover the heat of the supercharged air and the steam generated by the economizer.

In the energy recovery system X1, the first to third heat sections 2A to 2C are integrally formed within the heat exchanger body 21, which can achieve a size reduction in the heat exchanger 2. The heat exchanger 2 causes the working medium and the supercharged air to form the opposite flows in the first heat section 2A and the third heat section 2C. This configuration can increase the thermal energy recovery rate from the supercharged air in the energy recovery system X1.

Second Embodiment

Next, a heat exchanger 2 having another configuration for use in an energy recovery system X1 will be described with reference to FIG. 3.

Figure 3:
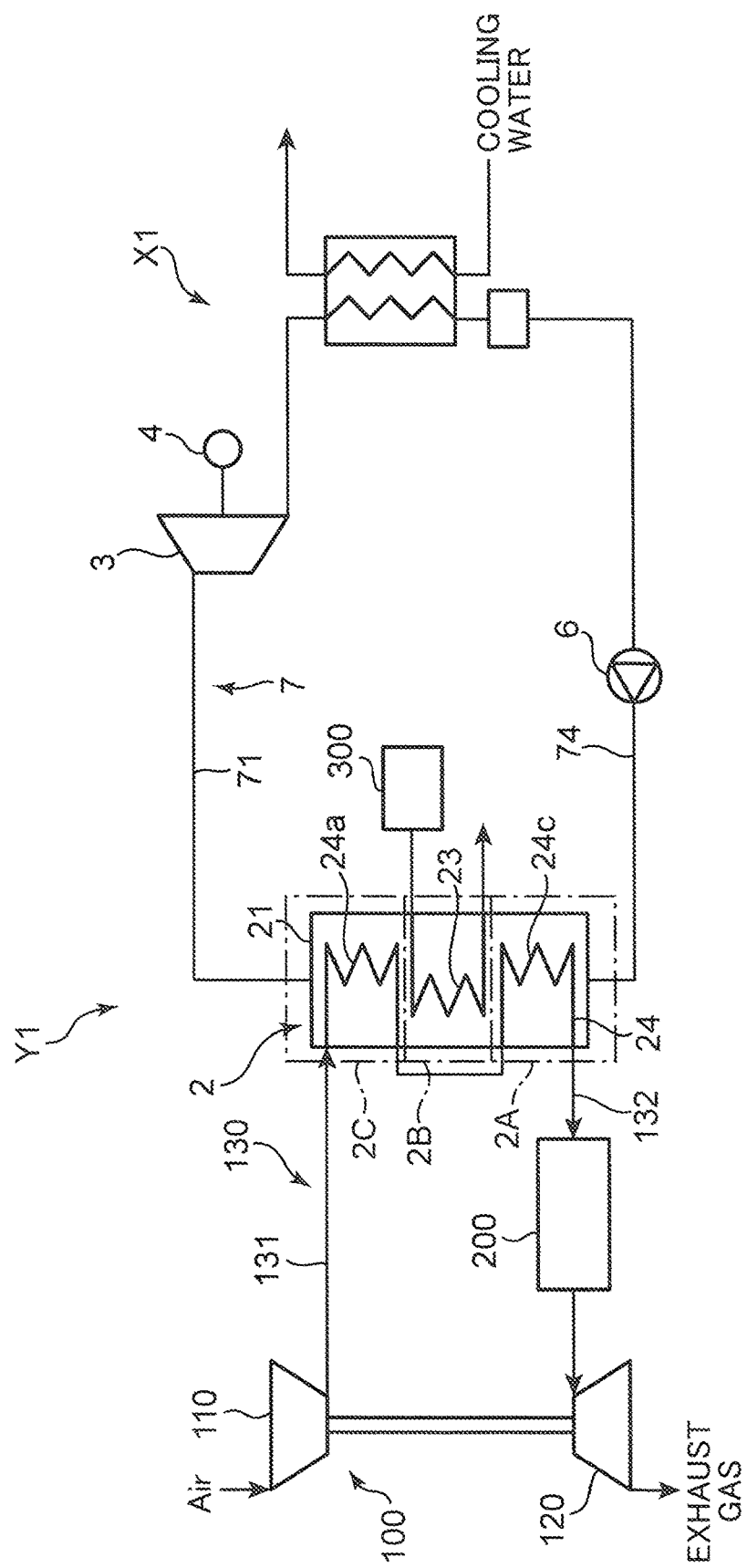
FIG. 3 is a schematic diagram showing another configuration of a vessel Y1 according to a second embodiment of the present invention.
Figure 4:
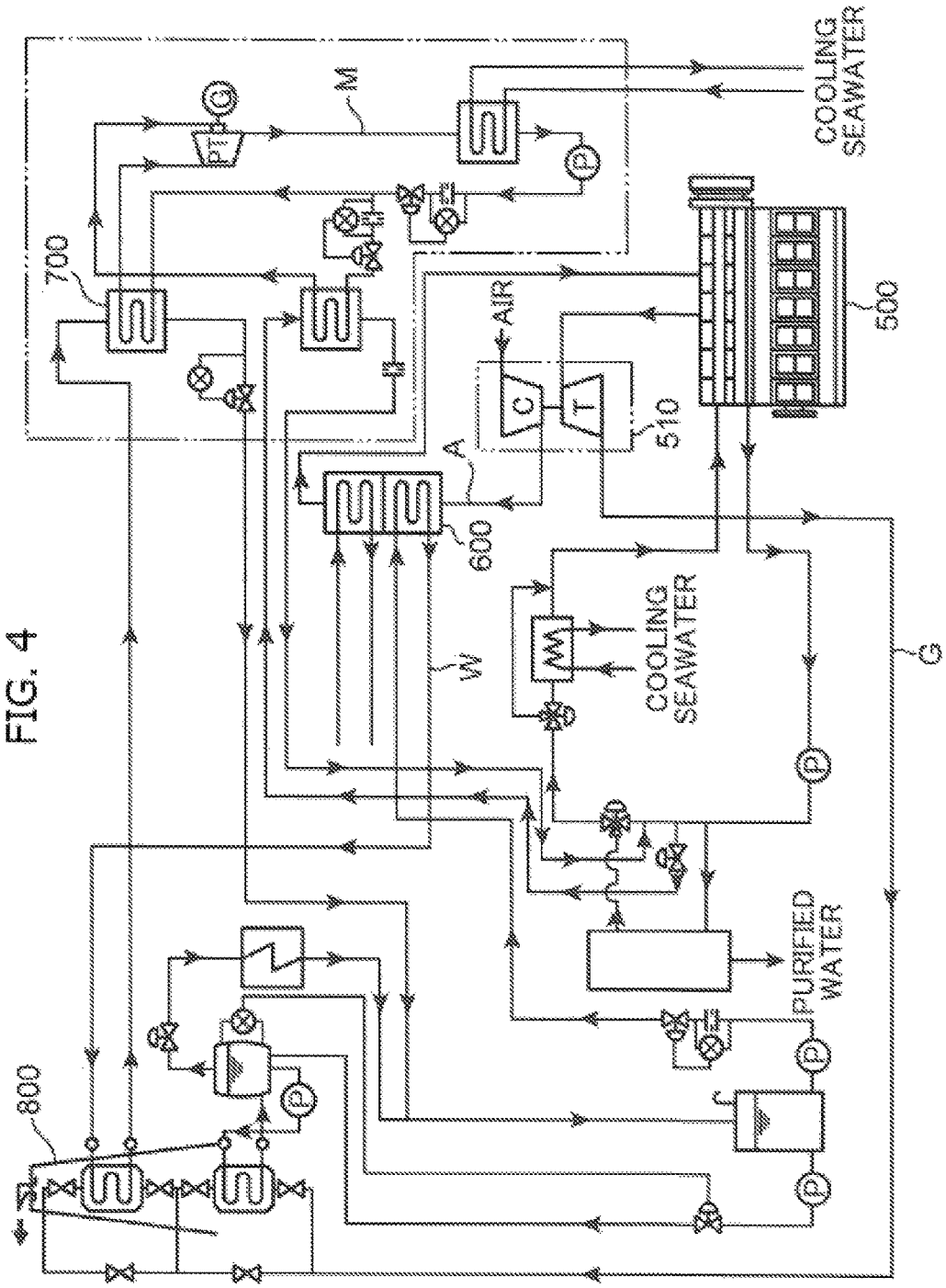
FIG. 4 is a schematic diagram showing a configuration of the exhaust heat recovery system disclosed in Patent Literature 1.

The heat exchanger 2 shown in FIG. 3 includes a heat exchanger body 21, a supercharged air tube 24 for allowing the supercharged air to flow therethrough, and a steam tube 23 for allowing steam having been flown out of an economizer 300 to flow therethrough. The heat exchanger body 21 accommodates the supercharged air tube 24 and the steam tube 23 therein. The heat exchanger body 21 defines therein a chamber space for permitting a working medium to flow outside the supercharged air tube 24 and the steam tube 23. Hereinafter, the chamber space is referred to as "working medium flow space". The working medium flow space is connected to a portion 71 of a circulation flow tube 7 that connects the expander 3 and the heat exchanger 2 with each other, and connected to another portion 74 that connects a pump 6 and the heat exchanger 2 with each other.

The supercharged air tube 24 has an upstream portion 24a and a downstream portion 24c respectively located at an upstream position and a downstream position in a flow direction of the supercharged air. In the heat exchanger body 21, the upstream portion 24a and the downstream portion 24c are respectively located at a downstream position and an upstream position of the working medium flow space. The upstream portion 24a is connected to a first scavenging line 131. The downstream portion 24c is connected to a second scavenging line 132. The steam tube 23 lies between the upstream portion 24a and the downstream portion 24c of the heat exchanger body 21.

The heat exchanger 2 has a first heat section 2A including the downstream portion 24c of the supercharged air tube 24 and a part of the working medium flow space, a second heat section 2B including the steam tube 23 and a part of the working medium flow space, and a third heat section 2C including the upstream portion 24a of the supercharged air tube 24 and a part of the working medium flow space.

The heat exchanger 2 permits the super charged air to flow in the order of the third heat section 2C and the first heat section 2A, and the working medium to flow in the order of the first heat section 2A, the second heat section 2B and the third heat section 2C. In other words, the supercharged air and the working medium form the opposite flows.

When the energy recovery system X1 is put in operation, the working medium in the state of liquid flows into the first heat section 2A. The first heat section 2A allows the working medium to be heated by the supercharged air having passed through the third heat section 2C. Moreover, the second heat section 2B allows the working medium in the state of liquid (that may contain a part in the state of gas) to be further heated by the steam to undergo vaporization, the steam having been supplied from the economizer 300 to the steam tube 23.

The third heat section 2C allows the working medium in the state of gas to be heated by the supercharged air to convert to superheated vapor. The supercharged air has a high temperature because of a short lapse of time after being discharged from the compressor 110. In other words, in the third heat section 2C, the working medium having been heated in the second section 213 is heated by the supercharged air before the supercharged air performs the heat exchange with the working medium in the first heat section 2A. The working medium flows into the expander 3 in the state of superheated vapor.

In the second embodiment, the working medium performs heat exchange with two heat mediums in the state of gas, that is, the supercharged air supplied to an engine 200 and the steam generated by the economizer 300. Thus, even in a case that the engine 200 of a vessel Y1 is run at a low load, the energy recovery system X1 can recover the sufficient thermal energy.

In the energy recovery system X1, the first to third heat sections 2A to 2C are integrally formed within the heat exchanger body 21, which can achieve a size reduction in the heat exchanger 2.

Heretofore, the embodiments of the present invention have been described. However, the disclosed embodiments and examples merely show examples in all the aspects, and thus should not be considered to be limited. The scope of the present invention should be defined by the scope of claims, not the description of the above-described embodiments, and further cover meanings equivalent to those readable in the scope of claims and all the changes falling within the scope of the claims. For example, the condensing unit 5 may be configured by only the condenser 51 without the storage part 52 and the connection tube 53. In this case, the condenser 51 has a portion for storing the working medium in the state of liquid therein.

In the embodiments, it may be appreciated to provide a plurality of heat exchangers each including a first heat section 2A, a second heat section 2B, and a third heat section 2C.

In the embodiments, it may be appreciated to permit the working medium to flow out of the heat exchanger 2 in the state of saturated vapor unless the working medium liquefies on the way from the heat exchanger 2 to the expander 3. As a driving power receiver for receiving a driving power of the expander 3, a rotary machine such as a compressor may be provided in place of the electric power generator 4.

Hereinafter, the first and second embodiments will be summarized.

The heat exchanger is for use in an energy recovery system to be mounted on a vessel including an engine, a supercharger for supplying supercharged air to the engine, and an economizer for generating steam by utilizing heat of an exhaust from the engine, the heat exchanger being adapted for transferring heat of the supercharged air and the steam to a working medium for driving an expander of the energy recovery system, the heat exchanger including: a first heat section for heating the working medium by the supercharged air; a second heat section for heating the supercharged air by the steam generated by the economizer before the supercharged air flows into the first heat section; and a third heat section for heating the working medium having been heated in the first section by the supercharged air which is to be heated in the second heat section.

In the heat exchanger, the supercharged air having the temperature which has lowered due to the heat exchange with the working medium in the third heat section is heated in the second heat section by the steam. The supercharged air having the temperature which has risen owing to this heating can ensure heating of the working medium. Thus, even in the case that the engine of the vessel is run at a low load, the energy recovery system can recover the sufficient thermal energy.

The heat exchanger is preferred to include: a working medium tube for allowing the working medium to flow therethrough; a steam tube for allowing the steam generated by the economizer to flow therethrough; and a heat exchanger body accommodating the working medium tube and the steam tube therein, and defining a chamber space for permitting the supercharged air to flow outside the working medium tube and the steam tube. In this case, it is preferred that the first heat section includes an upstream portion of the working medium tube and a part of the chamber space, the third heat section includes a downstream portion of the working medium tube and a part of the chamber space, and the second heat section includes the steam tube and a part of the chamber space.

In the heat exchanger, the first to third heat sections are integrally formed within the heat exchanger body, which can achieve a size reduction in the heat exchanger.

The heat exchanger is for use in an energy recovery system to be mounted on a vessel including an engine, a supercharger for supplying supercharged air to the engine, and an economizer for generating steam by utilizing heat of an exhaust from the engine, the heat exchanger being adapted for transferring heat of the supercharged air and the steam to a working medium for driving an expander of the energy recovery system, the heat exchanger including: a first heat section for heating the working medium by the supercharged air; a second heat section for heating the working medium having been heated in the first heat section by the steam generated by the economizer; and a third heat section for heating the working medium having been heated in the second heat section by the supercharged air which is to perform heat exchange with the working medium in the first heat section.

In the heat exchanger, the working medium performs the heat exchange with the two heat mediums, that is, the supercharged air supplied to the engine and the steam generated by the economizer. Thus, even in the case that the engine of the vessel is run at a low load, the energy recovery system can recover the sufficient thermal energy.

It is preferred that the heat exchanger further includes: a supercharged air tube for allowing the supercharged air to flow therethrough; a steam tube for allowing the steam generated by the economizer to flow therethrough; and a heat exchanger body accommodating the supercharged air tube and the steam tube therein and defining a chamber space for permitting the working medium to flow outside the supercharged air tube and the steam tube. In this case, it is preferred that the first heat section includes a downstream portion of the supercharged air tube and a part of the chamber space, a third heat section includes an upstream portion of the supercharged air tube and a part of the chamber space, and the second heat section includes the steam tube and a part of the chamber space.

In the heat exchanger, the first to third heat sections are integrally formed within the heat exchanger body, which can achieve a size reduction in the heat exchanger.

In the heat exchanger, it is preferred that the third heat section permits the working medium to convert to superheated vapor.

The heat exchanger can prevent the working medium from partly condensing to liquid after flowing out of the heat exchanger.

The energy recovery system includes: a working medium including an organic fluid having a lower boiling point than water; a heat exchanger according to the present invention; a pump for supplying the working medium in the state of liquid to the first heat section of the heat exchanger; an expander for allowing the working medium in the state of gas to flow thereinto from the third section; a driving power receiver connected to the expander for receiving a driving power from the expander; and a condensing unit for condensing the working medium flown out of the expander.

After being mounted on the vessel, the energy recovery system utilizing the Rankine cycle of the organic fluid having the low boiling point can recover the sufficient thermal energy even in the case that the engine is run at a low load.

The vessel includes: an energy recovery system according to the present invention; an engine; a supercharger for supplying supercharged air to the engine; and an economizer for generating steam by utilizing heat of an exhaust from the engine.

The vessel includes an energy recovery system according to the present invention, and thus makes it possible to recover the sufficient thermal energy even in the case that the engine is run at a low load owing to the energy recovery system.

The invention claimed is:

1. A heat exchanger for use in an energy recovery system to be mounted on a vessel including an engine, a supercharger for supplying supercharged air to the engine, and an economizer for generating steam by utilizing heat of an exhaust from the engine, the heat exchanger being adapted for transferring heat of the supercharged air and the steam to a working medium for driving an expander of the energy recovery system, the heat exchanger comprising:
   a first heat section for heating the working medium by the supercharged air;
   a second heat section for heating the supercharged air by the steam generated by the economizer before the supercharged air flows into the first heat section; and
   a third heat section for heating the working medium having been heated in the first section by the supercharged air which is to be heated in the second heat section.

2. The heat exchanger according to claim 1, further comprising:
   a working medium tube for allowing the working medium to flow therethrough;
   a steam tube for allowing the steam generated by the economizer to flow therethrough; and
   a heat exchanger body accommodating the working medium tube and the steam tube therein, and defining a chamber space for permitting the supercharged air to flow outside the working medium tube and the steam tube, wherein
   the first heat section includes an upstream portion of the working medium tube and an upstream part of the chamber space, the third heat section includes a downstream portion of the working medium tube and a downstream part of the chamber space, and the second heat section includes the steam tube and a part of the chamber space between the upstream and the downstream parts thereof.

3. A heat exchanger for use in an energy recovery system to be mounted on a vessel including an engine, a supercharger for supplying supercharged air to the engine, and an economizer for generating steam by utilizing heat of an exhaust from the engine, the heat exchanger being adapted for transferring heat of the supercharged air and the steam to a working medium for driving an expander of the energy recovery system, the heat exchanger comprising:
   a first heat section for heating the working medium by the supercharged air;
   a second heat section for heating the working medium by the steam generated by the economizer after the working medium has been heated in the first heat section; and
   a third heat section for heating the working medium by the supercharged air after the working medium has been heated in the second heat section,
   wherein the supercharged air flows in order from the third heat section to the first heat section and from the first heat section to the engine.

4. The heat exchanger according to claim 3, further comprising:
   a supercharged air tube for allowing the supercharged air to flow therethrough;
   a steam tube for allowing the steam generated by the economizer to flow therethrough; and
   a heat exchanger body accommodating the supercharged air tube and the steam tube therein, and defining a chamber space for permitting the working medium to flow outside the supercharged air tube and the steam tube, wherein
   the first heat section includes an upstream portion of the working medium tube and an upstream part of the chamber space, the third heat section includes a downstream portion of the working medium tube and a downstream part of the chamber space, and the second heat section includes the steam tube and a part of the chamber space between the upstream and the downstream parts thereof.

5. The heat exchanger according to claim 1, wherein the third heat section permits the working medium to covert to superheated vapor.

6. An energy recovery system, comprising:
   a working medium including an organic fluid having a lower boiling point than water;
   the heat exchanger according to claim 1;
   a pump for supplying the working medium in the state of liquid to the first heat section of the heat exchanger;
   the expander for allowing the working medium in the state of gas to flow into the expander from the third section;
   a driving power receiver connected to the expander for receiving a driving power from the expander, and
   a condensing unit for condensing the working medium flown out of the expander.

7. A vessel, comprising:
   the energy recovery system according to claim 6;
   the engine;
   the supercharger for supplying supercharged air to the engine; and
   the economizer for generating steam by utilizing heat of an exhaust from the engine.

8. An energy recovery system, comprising:
   a working medium including an organic fluid having a lower boiling point than water;
   the heat exchanger according to claim 3;
   a pump for supplying the working medium in the state of liquid to the first heat section of the heat exchanger;
   the expander for allowing the working medium in the state of gas to flow into the expander from the third section;

a driving power receiver connected to the expander for receiving a driving power from the expander, and a condensing unit for condensing the working medium flown out of the expander.

\* \* \* \* \*